United States Patent
Ruiz et al.

(10) Patent No.: US 10,328,632 B2
(45) Date of Patent: Jun. 25, 2019

(54) MODULAR SYSTEM FOR DETECTING INOPERATIVE EJECTORS IN THREE-DIMENSIONAL OBJECT PRINTERS

(71) Applicant: Xerox Corporation, Norwalk, CT (US)

(72) Inventors: Erwin Ruiz, Rochester, NY (US); Paul M. Fromm, Rochester, NY (US); Jeffrey N. Swing, Rochester, NY (US); James J. Spence, Honeoye Falls, NY (US); Mark A. Atwood, Rush, NY (US)

(73) Assignee: Xerox Corporation, Norwalk, CT (US)

( * ) Notice: Subject to any disclaimer, the term of this patent is extended or adjusted under 35 U.S.C. 154(b) by 558 days.

(21) Appl. No.: 15/164,542

(22) Filed: May 25, 2016

(65) Prior Publication Data

US 2017/0341295 A1 Nov. 30, 2017

(51) Int. Cl.
| | |
|---|---|
| *B29C 64/20* | (2017.01) |
| *B29C 64/112* | (2017.01) |
| *B41J 29/393* | (2006.01) |
| *B29C 64/30* | (2017.01) |
| *B29C 64/393* | (2017.01) |
| *B29C 64/386* | (2017.01) |
| *B41J 2/165* | (2006.01) |
| *B33Y 30/00* | (2015.01) |
| *B33Y 40/00* | (2015.01) |
| *B33Y 50/02* | (2015.01) |

(52) U.S. Cl.
CPC .......... *B29C 64/112* (2017.08); *B29C 64/20* (2017.08); *B29C 64/30* (2017.08); *B29C 64/386* (2017.08); *B29C 64/393* (2017.08); *B41J 2/16517* (2013.01); *B41J 2/16579* (2013.01); *B41J 29/393* (2013.01); *B33Y 30/00* (2014.12); *B33Y 40/00* (2014.12); *B33Y 50/02* (2014.12)

(58) Field of Classification Search
CPC ..... B29C 64/112; B29C 64/386; B29C 64/20; B29C 64/393; B29C 64/30; B41J 2/16517; B41J 2/16579; B41J 29/393
See application file for complete search history.

(56) References Cited

U.S. PATENT DOCUMENTS

| | | | | |
|---|---|---|---|---|
| 2,456,009 | A * | 12/1948 | McLane | B41L 23/20 101/116 |
| 6,169,605 | B1 * | 1/2001 | Penn | B33Y 50/00 358/1.1 |
| 7,360,854 | B2 | 4/2008 | Morisaki | |
| 7,484,830 | B2 | 2/2009 | Kim et al. | |
| 2013/0182029 | A1 * | 7/2013 | Snyder | B41J 2/16579 347/19 |

* cited by examiner

*Primary Examiner* — Joseph S Del Sole
*Assistant Examiner* — John Robitaille
(74) *Attorney, Agent, or Firm* — Maginot Moore & Beck LLP (57) ABSTRACT

A printhead maintenance module is configured as a replaceable unit. The module includes a frame, at least two rollers detachably mounted within the frame, at least two electric motors, a platen, an optical sensor, and a controller. Each electric motor is operatively connected to one of the rollers in a one-to-one correspondence. The controller is configured to operate one of the electric motors to rotate one of the rollers to move media from a position opposite a printhead where a test pattern is printed on the media to a position opposite the optical sensor, receive image data of the printed test pattern generated by the optical sensor, and identify inoperative ejectors with reference to the image data of the test pattern.

18 Claims, 11 Drawing Sheets

MODULAR SYSTEM FOR DETECTING INOPERATIVE EJECTORS IN THREE-DIMENSIONAL OBJECT PRINTERS

TECHNICAL FIELD

This disclosure is directed to three-dimensional object printing systems and, more particularly, to systems for detecting inoperative ejectors in such printing systems.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use inkjet printing, where one or more printheads eject successive layers of material. Three-dimensional printing is distinguishable from traditional object-forming techniques, which mostly rely on the removal of material from a work piece by a subtractive process, such as cutting or drilling.

Some three-dimensional printers operate one or more printheads to form three-dimensional printed objects. Each printhead includes a plurality of ejectors that emit drops of one or more build materials to form a three-dimensional printed object on a layer-by-layer basis. During operation, some of the ejectors in the printhead may become clogged or otherwise fail to operate in a reliable manner. The printer moves the printhead to a maintenance station to perform printhead cleaning, purging, or other maintenance operations to return the ejectors to operation. In some embodiments, the printer operates the printhead to form a predetermined test pattern. The printer generates image data of the test pattern to identify inoperative ejectors to determine if a maintenance operation is necessary. In many three-dimensional printers, the printhead forms printed test patterns on a surface of a print medium, such as a roll of metalized Mylar film, thermal paper, or another type of printing paper. The print medium roll is replaced after multiple printhead test pattern formation operations, and the print medium roll is one consumable item in the printer that contributes to the cost and operation of the printer. Improving the maintenance station to reduce the consumption of print media and facilitate the servicing of maintenance station would be beneficial.

SUMMARY

In one embodiment, a printer includes a maintenance station that facilitates replacement of the print media and preserves the gap between the print media and an optical sensor. The printer includes a printhead including a plurality of ejectors configured to eject drops of a marking agent, at least one actuator operatively connected to the printhead, the at least one actuator being configured to move the printhead along a member, and a printhead maintenance module. The printhead maintenance module has a frame, at least two rollers detachably mounted within the frame, at least two electric motors, each electric motor being operatively connected to one of the rollers in a one-to-one correspondence to enable independent and bidirectional rotation of each roller, a platen extending across the frame in a cross-process direction, a sensor assembly having an optical sensor configured to generate image data, the sensor assembly extending across the frame in the cross-process direction, and a controller operatively connected to the printhead, the at least one actuator, each electric motor, and the optical sensor in the sensor assembly. The controller is configured to operate the at least one actuator to move the printhead to a position opposite the platen in the frame, operate the plurality of ejectors in the printhead to eject drops of the marking agent onto media adjacent the platen to form a printed test pattern, operate one of the electric motors to rotate at least one of the rollers to move the media from the position opposite the printhead to a position opposite the optical sensor in the sensor assembly, receive image data of the printed test pattern generated by the optical sensor, and identify inoperative ejectors with reference to the image data of the test pattern.

In another embodiment, the maintenance system is incorporated in a module that can be retrofitted to existing three-dimensional object printers. The modular maintenance system includes a frame, at least two rollers detachably mounted within the frame, at least two electric motors, each electric motor being operatively connected to one of the rollers in a one-to-one correspondence to enable independent and bidirectional rotation of each roller, a platen extending across the frame in a cross-process direction, a sensor assembly having an optical sensor configured to generate image data, the sensor assembly extending across the frame in the cross-process direction, and a controller operatively connected to each electric motor and the optical sensor in the sensor assembly. The controller is configured to operate one of the electric motors to rotate at least one of the rollers to move media from a position opposite a printhead where a test pattern is printed on the media to a position opposite the optical sensor in the sensor assembly, receive image data of the printed test pattern generated by the optical sensor, and identify inoperative ejectors with reference to the image data of the test pattern.

BRIEF DESCRIPTION OF THE DRAWINGS

The foregoing aspects and other features of an apparatus or printer that analyzes compact printed test patterns are explained in the following description, taken in connection with the accompanying drawings.

DETAILED DESCRIPTION

For a general understanding of the environment for the device disclosed herein as well as the details for the device, reference is made to the drawings. In the drawings, like reference numerals designate like elements.

As used herein, the term "build material" refers to a material that is ejected in the form of liquid drops from a plurality of ejectors in one or more printheads to form layers of material in an object that is formed in a three-dimensional object printer. Examples of build materials include, but are not limited to, thermoplastics, UV curable polymers, and binders that can be liquefied for ejection as liquid drops from ejectors in a printhead and subsequently hardened into a solid material that forms an object through an additive three-dimensional object printing process. Some three-dimensional object printers employ multiple forms of build material to produce an object. In some embodiments, different build materials with varying physical or chemical characteristics form a single object.

As used herein, the term "support material" refers to a form of material used in a three-dimensional object printer to support portions of a three-dimensional object during the printing process, but the support material does not form a permanent part of the three-dimensional printed object. Examples of support material include waxes that a printhead ejects to form a solid layer to support structures formed from the build material as the three-dimensional object printer forms successive layers of an object. After completion of the three-dimensional object printing operation, the support material is removed from the three-dimensional object leaving the structure formed by the build material intact.

As used herein, the term "marking agent" refers to a material that an inkjet printhead in a printer ejects onto an image receiving surface, such as a support member, a surface of a partially formed three-dimensional printed object, or a print medium. The build materials and support materials used in three-dimensional object printers are examples of marking agents. Additional examples include, but are not limited to, phase-change inks, aqueous inks, solvent-based inks, and the like.

As used herein, the term "process direction" refers to a direction of movement of an image receiving surface past a printhead. As described below, the image receiving surface and printhead in one embodiment remain stationary relative to each other as the printhead forms a printed test pattern on the image receiving surface. The image receiving surface then moves in the process direction past an optical sensor to enable the printer to produce image data of the printed test pattern. In some embodiments, an elongated roll of metalized Mylar, thermal paper, or another suitable paper print medium provides the image receiving surface. As used herein, the term "cross-process direction" refers to a direction that is perpendicular to the process direction on the image receiving surface.

As used herein, the term "test pattern" refers to a predetermined arrangement of printed marks that a plurality of ejectors in a printhead form on an image receiving surface. In some embodiments, a "compact test pattern" refers to a test pattern formed from marks that cover a region of the image receiving surface that is not substantially larger than the physical footprint of the corresponding ejectors in the printhead. In some embodiments, the compact test pattern occupies a region that is substantially equal to the footprint of the ejectors in the printhead. For example, as described in more detail below, the printhead and image receiving surface remain substantially stationary relative to each other and each ejector in the printhead ejects at least one drop of marking agent onto the image receiving surface in one embodiment. The printhead forms a compact test pattern that includes a set of marks arranged in a pattern that corresponds to the physical arrangement of ejectors in the printhead. The printhead ejects individual drops of the marking agent that form marks with a circular shape in the test pattern.

Figure 1:
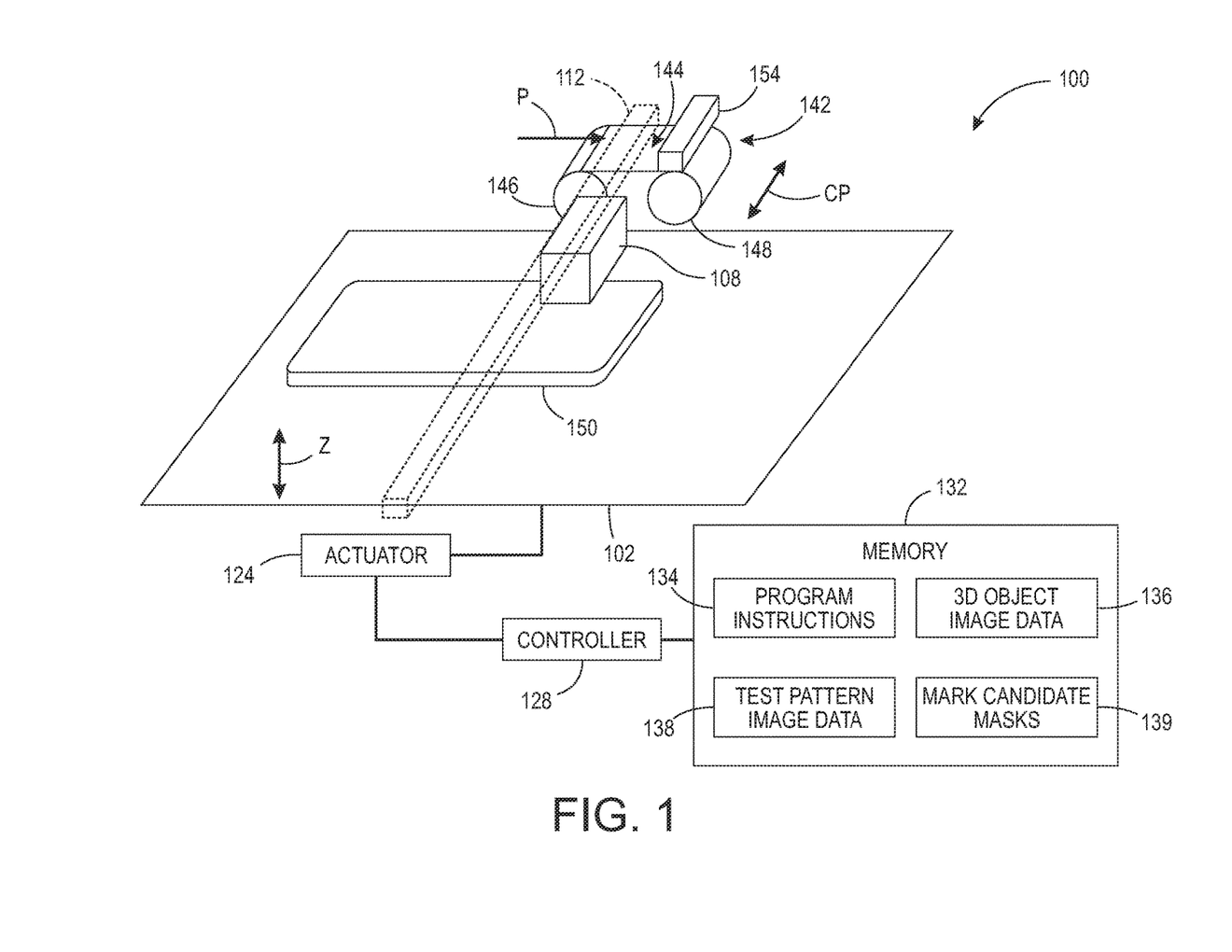
FIG. 1 is a diagram of a three-dimensional object printer having a printhead maintenance unit.

FIG. 1 depicts a three-dimensional object printer 100 that is configured to operate a printhead to form a three-dimensional printed object 150. The printer 100 includes a support member 102, printhead 108, printhead arm 112, controller 128, memory 132, and printhead maintenance unit 142. In the illustrative embodiment of FIG. 1, the three-dimensional object printer 100 is depicted during formation of a three-dimensional printed object 150 that is formed from a plurality of layers of a build material.

The support member 102 is a planar member, such as a metal plate, that supports the three-dimensional printed object 150 during the printing process. In one embodiment, the member 102 carries any previously formed layers of build material through the print zone opposite the printhead 108 in the process direction P. The support member 102 also follows a carousel path or moves in a reciprocating motion to move through the print zone for multiple passes past the printhead 108 to form the three-dimensional printed object 150. In another embodiment, the support member 102 remains stationary along the process direction axis P during the printing operation and the printhead arm 112 moves the printhead 108 in a rasterized motion along both the cross-process direction CP and process direction P to form each layer of the three-dimensional printed object. In the embodiment of FIG. 1, an actuator 124 also moves the support member 102 in the direction Z away from the printhead 108 after application of each layer of build and support material to ensure that the printhead 108 maintains a predetermined distance from the upper surface of the object 150.

The printhead 108 includes a plurality of ejectors that receive one or more marking agents in a liquefied form and eject liquid drops of build material and support material. In one embodiment, each ejector includes a fluid pressure chamber that receives the liquid marking agents, an actuator such as a piezoelectric actuator, and an outlet nozzle. The piezoelectric actuator deforms in response to an electric firing signal and urges the liquefied build material through the nozzle as a drop that is ejected toward the member 102. If the member 102 bears previously formed layers of a three-dimensional object, then the ejected drops of the build material form an additional layer of the object. When the printhead arm 112 moves the printhead 108 over the image receiving surface 144 of the media, the ejectors in the printhead 108 eject drops of the marking agent onto the image receiving surface 144. The printhead 108 includes a two-dimensional array of the ejectors, with an exemplary printhead embodiment including 880 ejectors. During operation, the controller 128 controls the generation of the electrical firing signals to operate selected ejectors at different times to form each layer of the build material for the object 150 with reference to the 3D object image data 136. The controller 128 also operates the ejectors with reference to the test pattern image data 138 to form a compact test pattern on the surface 144.

While FIG. 1 depicts a single printhead 108 that ejects drops of a build material, alternative printer configurations include multiple printheads that eject one or more types of marking agent. Additionally, in some embodiments a single printhead ejects different types of marking agent from multiple sets of ejectors in the printhead. As described below, printheads typically include two-dimensional arrays of ejectors that are grouped into rows. In some embodiments, one or more sets of ejector rows eject different types of marking agent onto the image receiving surface. In some printhead embodiments, different sets of ejectors also eject the marking agent with different drop sizes that form marks with varying sizes in a test pattern. For example, in one embodiment a printhead ejects drops of a build material from a first set of ejectors and drops of a phase-change ink from a second set of ejectors. The drops of the build material that form the structure of a three-dimensional printed object are larger than the drops of the phase-change ink that the printer uses to form printed text and images on a surface of the three-dimensional object.

The printhead arm 112 includes a support member and one or more actuators 124 that move the printhead 108 during printing and maintenance operations. The actuators 124 are operatively connected to the controller 128 and the controller 128 operates the actuators to coordinate the movement of the various components for printing and maintenance operations. The printhead arm 112 moves the printhead 108 in a reciprocating motion along the cross-process direction CP during a printing operation. The ejectors in the printhead 108 eject drops of a build material and other materials onto portions of the object 150 as the printhead 108 moves across the object 150. In one embodiment, an actuator that is operatively connected to the printhead arm 112 moves the printhead arm 112 in the process direction P to enable the printhead 108 to move in both the cross-process and process directions during the printing operation. The printhead arm 112 also extends to the printhead maintenance unit 142. During a maintenance operation, the printhead arm 112 moves the printhead 108 to the printhead maintenance unit 142 to position the plurality of ejectors in the printhead 108 over the image receiving surface 144. As described below, the printhead 108 forms compact printed test patterns on the image receiving surface 144 of the media.

In the printer 100, the printhead maintenance unit 142 includes a supply spindle 146 and a take-up spindle 148 about which a roll of print media is entrained, and an optical sensor 154. In some embodiments the printhead maintenance unit 142 also includes a printhead cleaning device or other maintenance hardware (not shown) that perform maintenance operations to clean the printhead 108 and maintain operation of the ejectors in the printhead 108. The roll of print media is an elongated roll of metallized Mylar, paper, or another suitable material to receive printed marks from the ejectors in the printhead 108. The region of the roll of the print media between the supply spindle 146 and the take-up spindle 148 forms the image receiving surface 144 that receives a compact test pattern from the printhead 108. During operation, the printhead 108 ejects drops of marking agent onto the image receiving surface 144 to form a compact printed test pattern. An actuator in the printhead maintenance unit 142 moves the image receiving surface 144 and the printed test pattern on the surface past the optical sensor 154 in the process direction P. The optical sensor 154 includes an array of sensing elements that are arranged along the cross-process direction CP to generate scanlines of pixels. The optical sensor 154 generates a series of the pixel scanlines as the printed test pattern on the image receiving surface 144 moves past the optical sensor 154 to generate two-dimensional image data of the image receiving surface and the printed test pattern. In another embodiment, a two-dimensional optical sensor generates the image data as a single two-dimensional image that includes the marks in the compact printed test pattern.

The controller 128 is a digital logic device such as a microprocessor, microcontroller, field programmable gate array (FPGA), application specific integrated circuit (ASIC) or any other digital logic that is configured to operate the printer 100. In the printer 100, the controller 128 is operatively connected to one or more actuators that control the movement of the support member 102, the printhead arm 112, and the movement of the print media from the supply spindle 146 to the take-up spindle 148. The controller 128 is also operatively connected to the printhead 108 to control operation of the plurality of ejectors in the printhead 108.

The controller 128 is also operatively connected to a memory 132. In the embodiment of the printer 100, the memory 132 includes volatile data storage devices such as random access memory (RAM) devices and non-volatile data storage devices such as solid-state data storage devices, magnetic disks, optical disks, or any other suitable data storage devices. The memory 132 stores programmed instruction data 134, three-dimensional (3D) object image data 136, test pattern image data 138 that include compact test patterns, and mask image data 139 that correspond to an expected size and shape of one or more marks in the printed test patterns. The controller 128 executes the stored program instructions 134 to operate the components in the printer 100 to both form the three-dimensional printed object 150 and print two-dimensional images on one or more surfaces of the object 150. The 3D object image data 136 include, for example, a plurality of two-dimensional image data patterns that correspond to each layer of build material and optionally support material that the printer 100 forms during the three-dimensional object printing process. The controller 128 ejects drops of the build material from the printhead 108 with reference to each set of two-dimensional image data to form each layer of the object 150. The memory 132 also stores test pattern image data 138 that the controller 128 uses to operate the ejectors in the printhead 108 to print test patterns on the image receiving surface 144 when the printhead arm 112 moves the printhead 108 to the printhead maintenance unit 142.

During a maintenance procedure, the controller 128 operates the arm 112 to move the printhead 108 into the printhead maintenance unit 142 over the surface of the media roll 144. As described in more detail below, the controller 128 operates the ejectors in the printhead 108 to eject drops of marking agent onto the image receiving surface 144 while the printhead 108 and the surface 144 remain stationary relative to each other. The ejected pattern of drops forms a compact test pattern that occupies a region of the surface 144 of approximately the same size as the array of ejectors in the printhead 108. The controller 128 then operates an actuator to move the image receiving surface 144 and compact test pattern past the optical sensor 154 to produce image data of the compact test pattern. The controller 128 identifies inoperative ejectors in the printhead 108 and performs printhead maintenance activities if needed to return the inoperable ejectors to operation.

Figure 2:
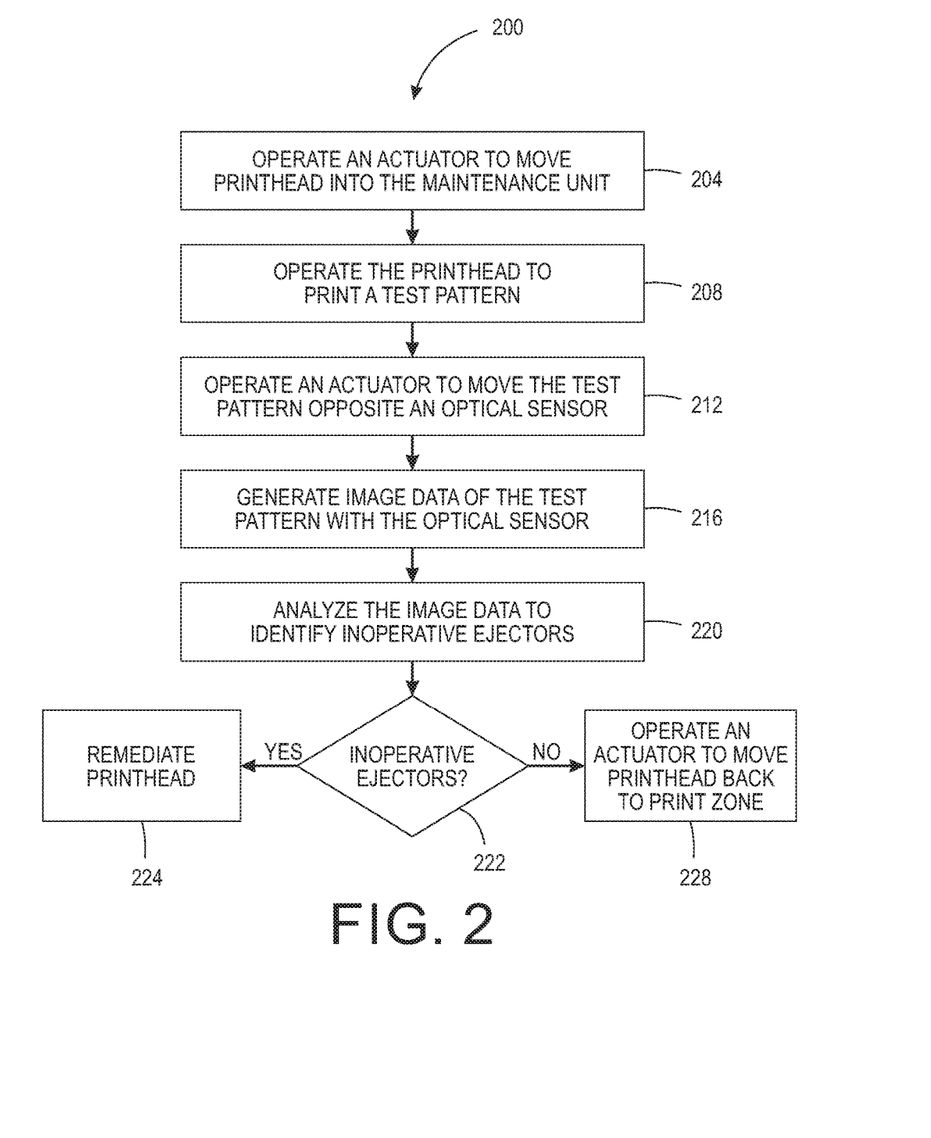
FIG. 2 is a flow diagram of a process for operating the printer of FIG. 1 to detect inoperative ejectors.

FIG. 2 depicts a process 200 for operating the printer to detect inoperative ejectors. In the description below, a reference to the process 200 performing an action or function refers to the operation of a controller, such as the controller 128, to execute stored program instructions to perform the function or action in association with other components in an inkjet printer. The process 200 is described in conjunction with the printer 100 of FIG. 1 for illustrative purposes.

Process 200 begins as the controller operates one or more actuators to move the printhead into the maintenance unit 142 (block 204). The controller then operates the printhead with reference to the test pattern image data to eject drops of marking agent onto the image receiving surface of a portion of the print media extending between the spindles 146 and 148 (block 208). The controller 112 performs this processing by operating the actuators and the printhead arm 112 to move the printhead 108 into position in the printhead maintenance unit 142 and generating firing signals to operate the ejectors in the printhead 108 while the printhead 108 and image receiving surface 144 remain stationary relative to one another. During operation, each ejector ejects at least one drop of the marking agent to form a corresponding printed mark on the image receiving surface. In some embodiments, the controller 128 operates each ejector more than once to form marks using multiple drops of the marking agent. As described above, some of the ejectors in the printhead may be inoperative and may fail to eject drops in a consistent manner or eject drops onto an incorrect location in the printed test pattern.

Process 200 continues as the controller 128 operates an electric motor operatively connected to the take-up spool 148 to advance the portion of the media bearing the test pattern in the process direction P to a position opposite the optical sensor 154 (block 212). There, the optical sensor 154 generates image data of the printed test pattern on the image receiving surface 144 (block 216). The optical sensor 154 generates a two-dimensional array of image data including both the image receiving surface 144 and the printed marks formed on the surface 144. The controller 128 receives the image data and analyzes the image data to locate marks in the test pattern that correspond to rows of ejectors in the printhead 108 to identify inoperative ejectors (block 220). If inoperative ejectors are detected (block 222), the controller 128 operates components in the printhead maintenance unit 142 to remediate the inoperative ejectors (block 224). Otherwise, the controller 128 returns the printhead 108 to a position over the platen 102 to continue the printing of a three-dimensional object (block 228).

Figure 3:
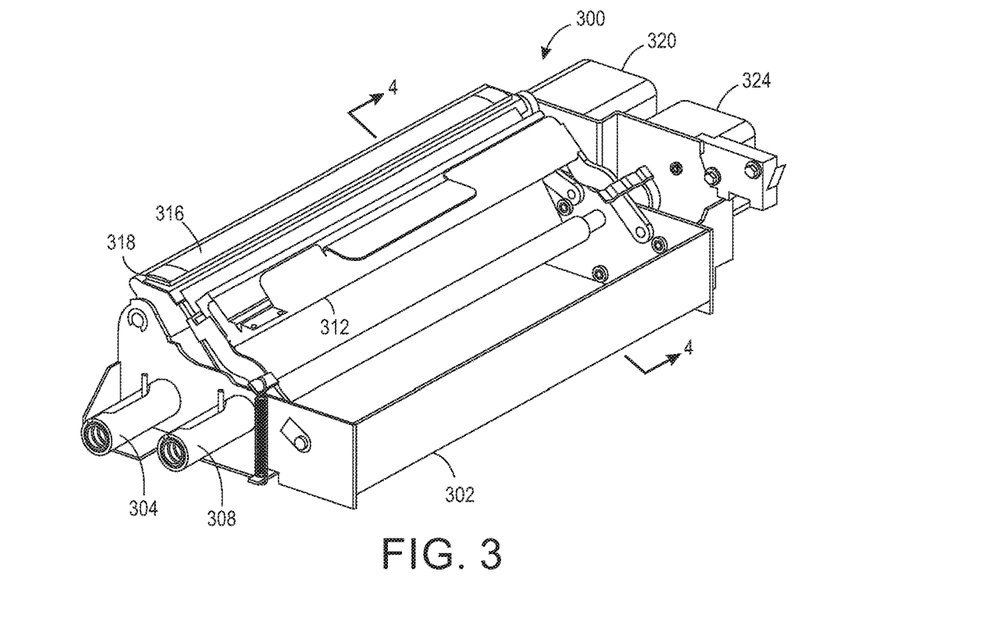
FIG. 3 is a perspective view of a modular printhead maintenance unit.
Figure 4:
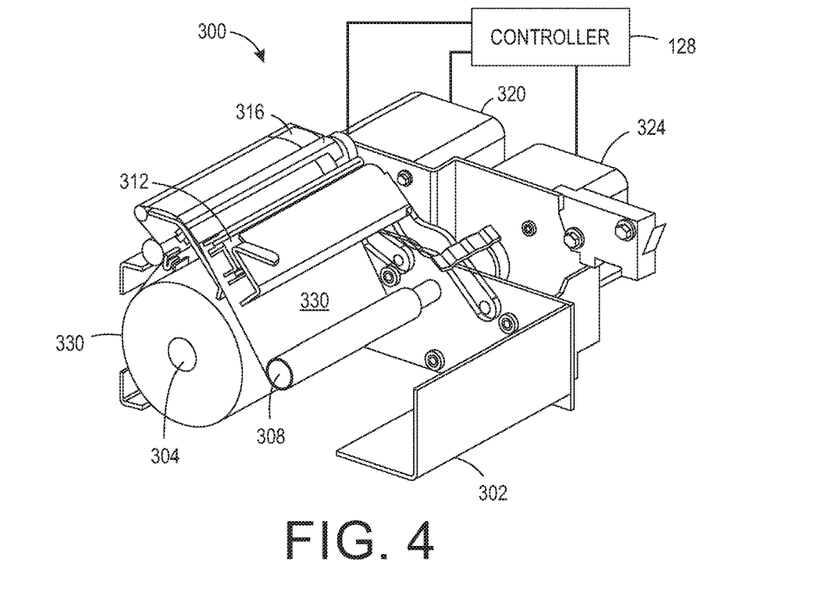
FIG. 4 is a cross-sectional view of the modular unit shown in FIG. 3 taken along lines 4-4.

FIG. 3 depicts a printhead maintenance module 300. The module 300 includes a frame 302 to which a retractable supply roller 304 and a retractable take-up roller 308 are detachably mounted. A sensor assembly 312, which includes an optical sensor and a test pattern platen 318 are also pivotally mounted to the frame 302 as described in more detail below. Electric motors 320 and 324 independently drive rollers 304 and 308, respectively, in one embodiment, and drive the rollers in one direction only in another embodiment described more fully below. The cross-sectional view of the module 300 provided in FIG. 4 shows a roll of media 330 that has been mounted about supply roller 304 and the loose end of the roll is passed over heater 316, which is mounted to the platen 318, underneath sensor assembly 312, and wrapped around take-up roller 308. The controller 128 is operatively connected to the electric motors 320 and 324 to operate the motors and drive the rollers 304 and 308, independently and bi-directionally, in the first embodiment now described.

Figure 5:
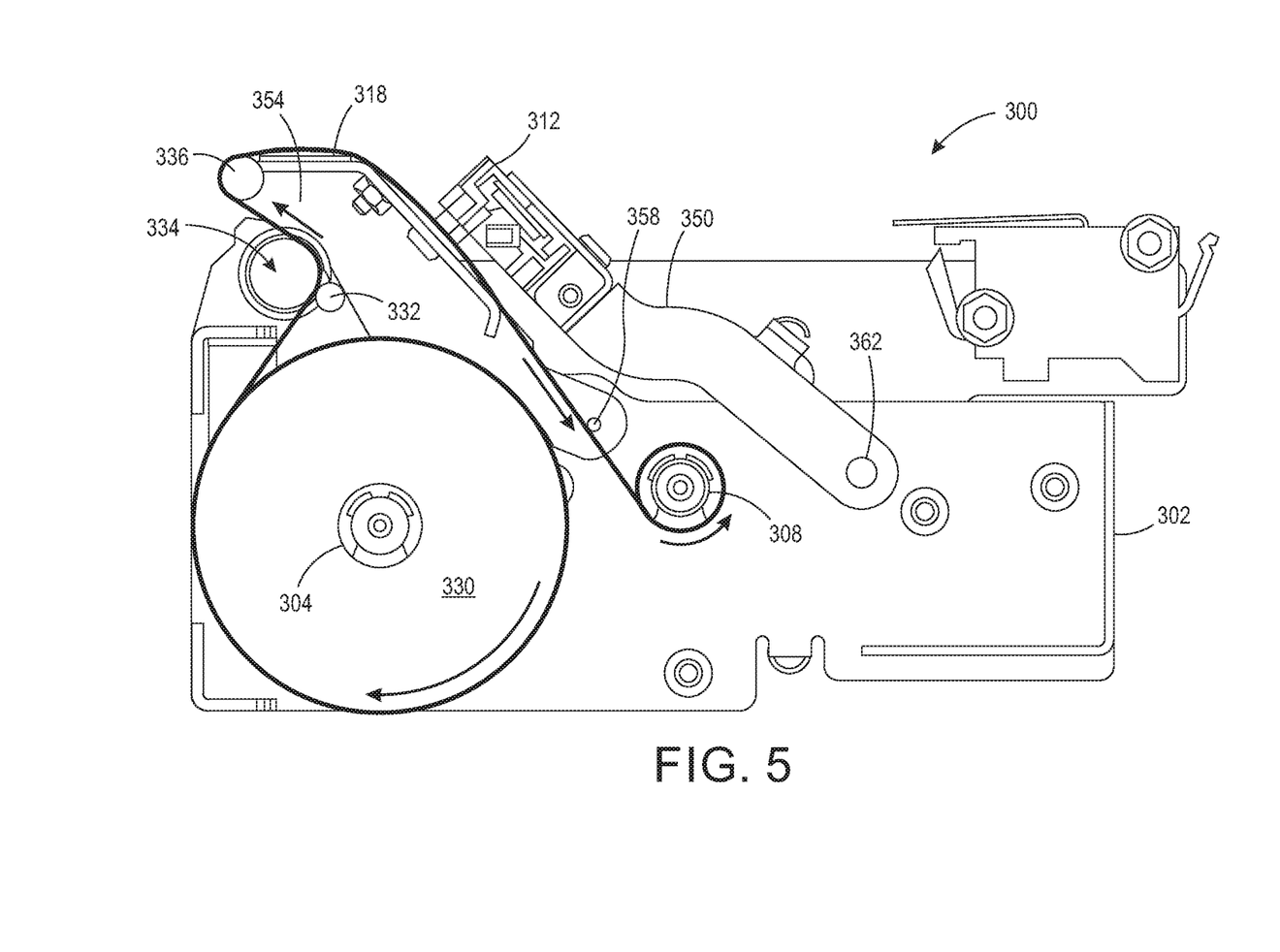
FIG. 5 is a side view of the modular unit shown in FIG. 3.

FIG. 5 shows a side view of the module 300 and illustrates the feed path for loading a new supply roll of media 330 into the module. As the arrow in the figure indicates, supply roller 304, onto which the supply roll 330 is mounted, rotates in a clockwise direction. A loose end of the roll leaves the roll at about the ten o'clock position, enters a nip between the roller 334 and the wheel 332, and wraps over the roller 334 from about the four o'clock position to about the twelve o'clock position. The end then bends around the next roller 336 from the six o'clock position to the one o'clock position before passing over the heater 316, which is mounted to the platen 318. The media then passes underneath the sensor assembly 312 and moves to the six o'clock position on the take-up roller 308. The end wraps around the roller 308 in the counterclockwise direction, which is the direction of rotation for the roller and tucks underneath the media coming into the roller. Once the media is loaded in the module, the controller 128 operates the motor 324 to rotate the roller 308 and pull media from the supply roll 330 and operates the motor 320 to retract media into the supply roll for reasons discussed below. A heater 316 lies adjacent to the test pattern platen 318 to heat the media as it passes over the heater. The controller 128 is operatively connected to the heater 316 to activate the heater selectively. When the supply roll 330 is made of thermal paper, for example, the heater is operated to enhance the contrast between the media and the material ejected onto the media. Once the take-up roller is rotated to take out the slack from the roll 330, the media is stretched across the heater 316 on the platen 318 and across the platen 374 (FIG. 7C) in the area opposite the sensor assembly 312 to improve the imaging of the test pattern on the media. Additionally, the curvature of the test pattern platen 318 and the curvature of the imaging platen 374 are approximately the same to enable the media to be pulled tautly across both platens.

The view of the module 300 in FIG. 5 shows the portion of frame 302 to which the electric motors 320 and 324 are mounted. A sensor assembly arm 350 and a platen arm 354 are also pivotally mounted to that same portion of the frame about pivot pins 362 and 358, respectively. Corresponding arms are mounted to the frame 302 on the opposite side of the frame. The sensor assembly 312 is mounted at each end to the arms 350 and the test pattern platen 318 is mounted at each end to the platen arms 354. This structure enables the sensor assembly 312 and the platen 318 to be rotated away from the interior within the frame 302 to make the roller accessible and facilitate the removal of a spent roll of media as well as to load a new media roll.

Figure 6A:
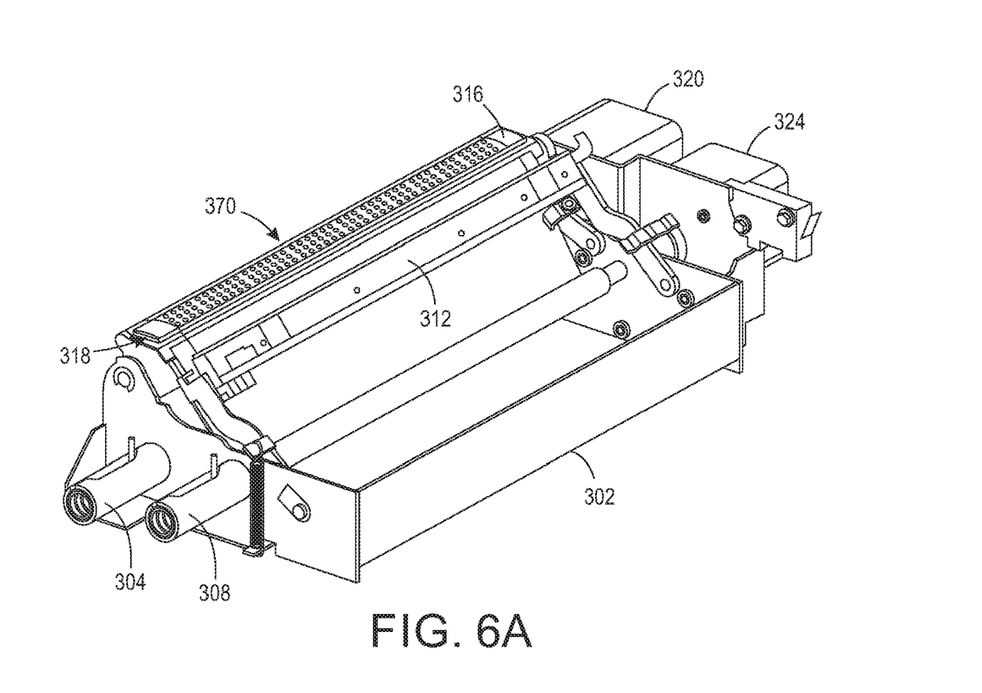
FIGS. 6A, 6B, and 6C depict the operation of the modular unit of FIG. 3 to print a test pattern, image the test pattern, and retract the media for detection of inoperative ejectors.
Figure 6B:
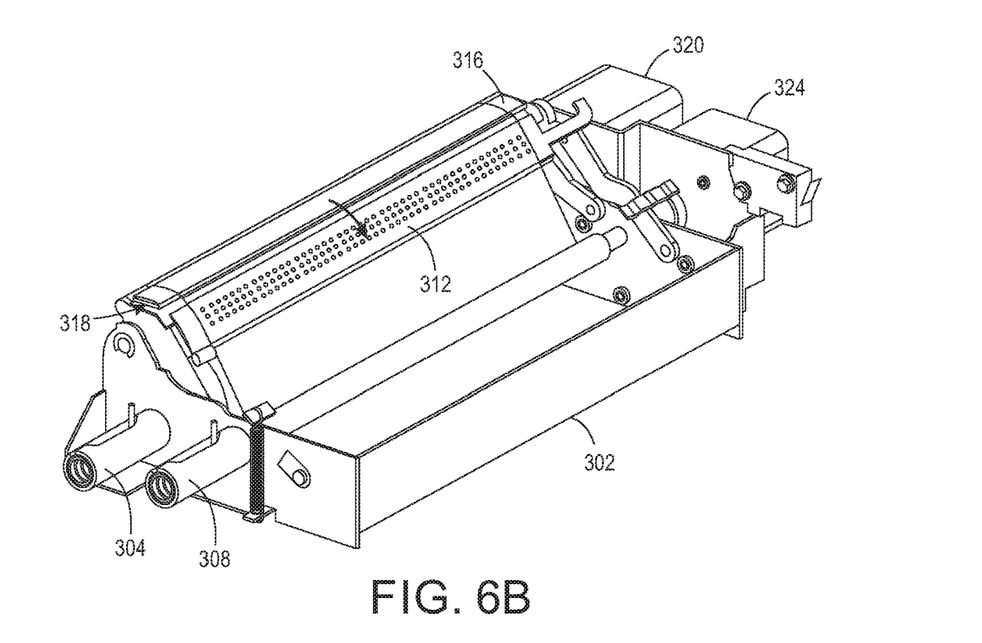
Figure 6C:
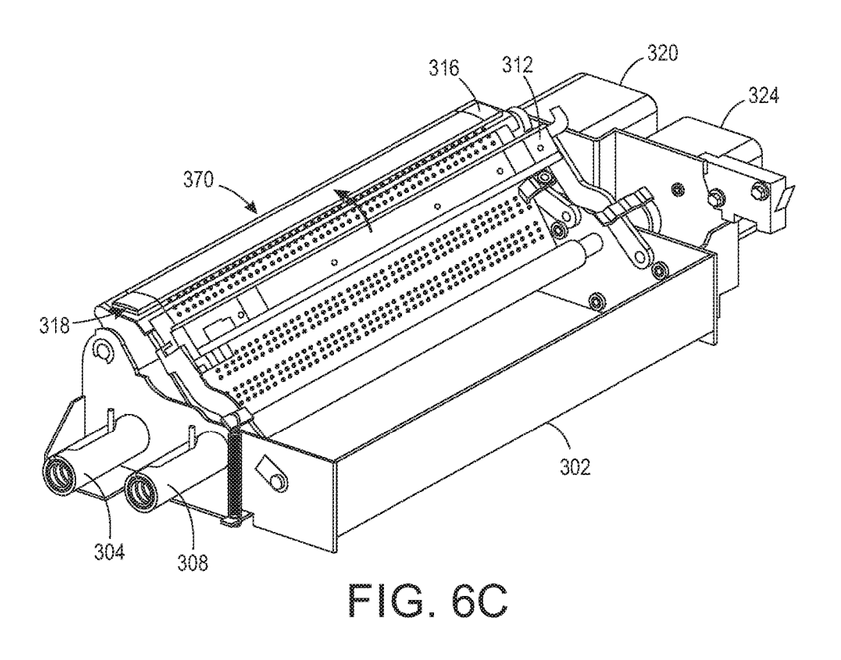

The operation of module 300 is depicted in FIGS. 6A, 6B, and 6C. These figures do not include the printhead arm 112 and the printhead 108 to simplify the figures for this discussion. Once the printhead 108 moves into the module 300, the controller 128 operates the printhead 108 to eject material onto the media as it moves over the heater 316 and the platen 318 to form a test pattern, such as test pattern 370 shown in FIG. 6A. The controller 128 operates electric motor 324 to move the printed test pattern to a position opposite the sensor assembly 312 as shown in FIG. 6B. Sensor assembly 312 is not shown in FIG. 6B to illustrate that the test pattern has moved from the test pattern platen 316 to a position where it is supported by the image platen 374 for stable imaging of the pattern. In one embodiment, the media moves 30 mm from the position where the pattern is printed to the position where the pattern is imaged. FIG. 6C shows that the controller 128 has operated the motor 320 to retract the media so the test pattern is positioned between the area where it was printed and the area where it was imaged. This portion of the operation conserves the media since the next test pattern is printed on the portion that now is adjacent to the test pattern platen.

In another embodiment of the module 300, the controller 128 is configured to operate the motor 320 to drive the roller 334 at a constant speed. Wheel 332 increases the tension the roller 334 can impart to the media. The controller 128 is also configured to operate the motor 324 to drive the roller 308 through a slip clutch to maintain tension on the media from the roller 334 to the roller 308 so the media moves at the speed of the rotation of the roller 334. In this embodiment, the media moves in only one direction so it does not conserve the media between the printing of the test image and the scanning of the image as described above for the embodiment having the bi-directionally rotating motors. This embodiment, however, enables the printed test pattern to be longer than the printing and imaging platens because regulation of the speed of the roller 334 enables the speed of the media to be well controlled and the printing and scanning can happen while the media is moving.

Figure 7A:
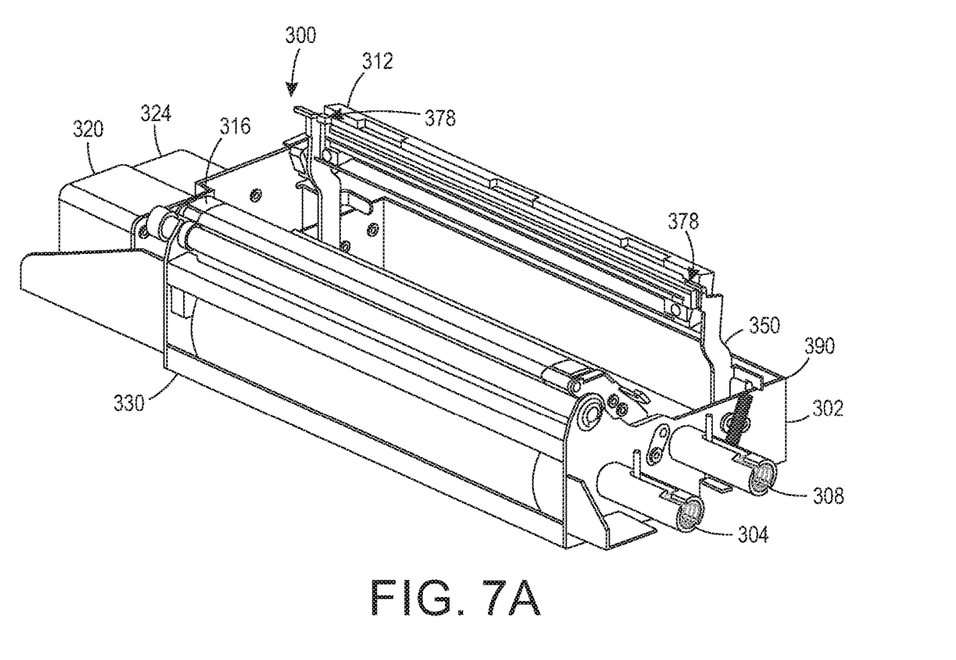
FIGS. 7A, 7B, and 7C depict a gap member configured on arms for positioning the optical sensor assembly at a predetermined distance from the platen on which the media bearing the test pattern rests while being imaged.
Figure 7B:
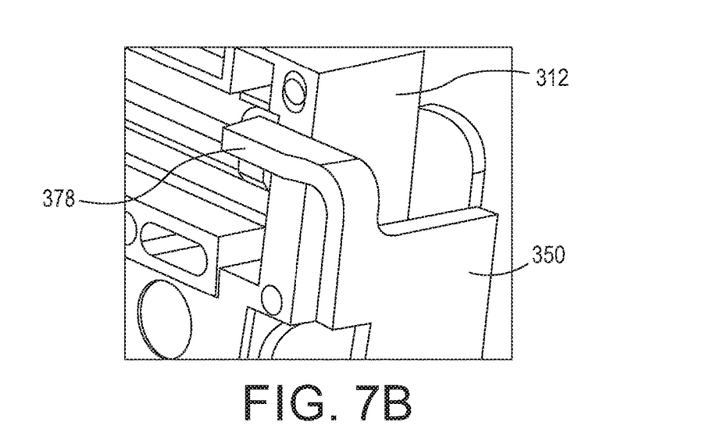
Figure 7C:
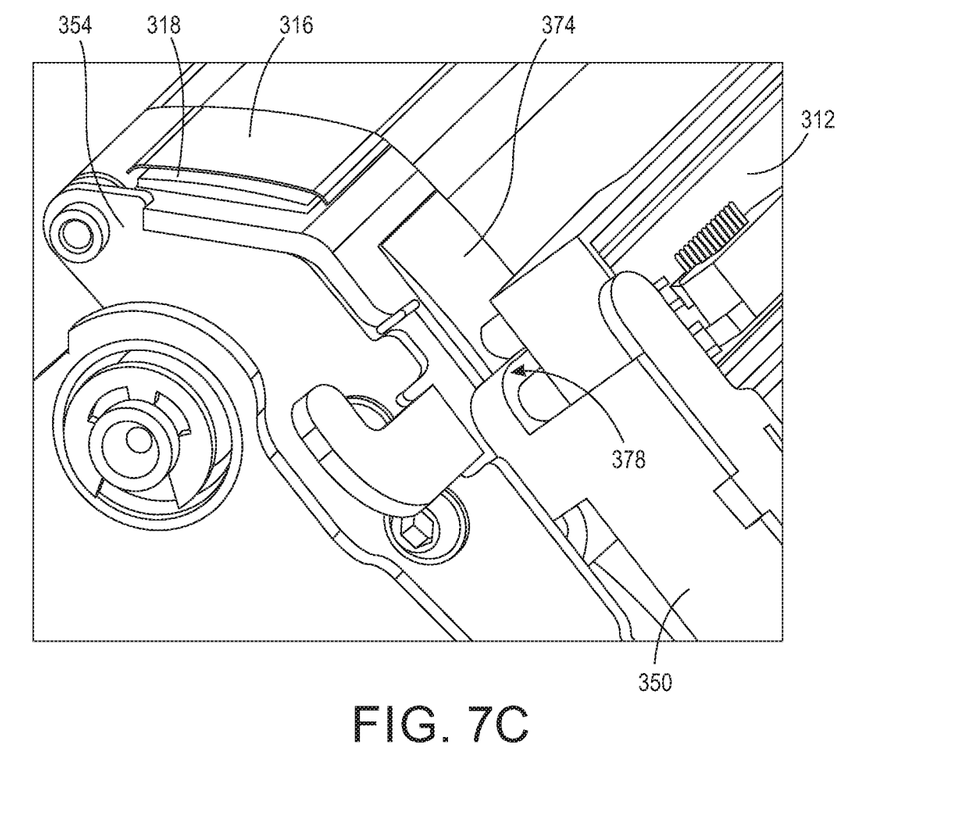

The view in FIG. 7A shows the sensor assembly arms 350 rotated away from the position where the optical sensor in sensor assembly 312 generates image data of the test pattern on the media 330. At the outboard ends of the arms 350, a biasing member 390 is attached between the frame 302 and one of the arms 350. The biasing member is depicted as a spring, although other types of biasing members can be used. A biasing member is provided at each arm 350 to help stabilize the rotation of the arms 350. Once a new supply roll has been installed in the module 300, the arms 350 are rotated towards the roll 330 to return the sensor assembly to the imaging position. The gap between the optical sensor in the assembly 312 and the media 330 is important since the optical sensor has a focal distance. To help ensure the sensor assembly returns to a position where the test pattern is located at or near the focal distance of the optical sensor, the arms 350 are provided with a gap member 378 (FIGS. 7B and 7C), which is positioned between the end of the sensor assembly 312 mounted to the arm 350 and the imaging platen 374. The gap member 378 is appropriately sized to provide a gap between the optical sensor in the sensor assembly 312 and the test pattern resting on imaging platen 374 that corresponds to the focal distance of the optical sensor.

Figure 8A:
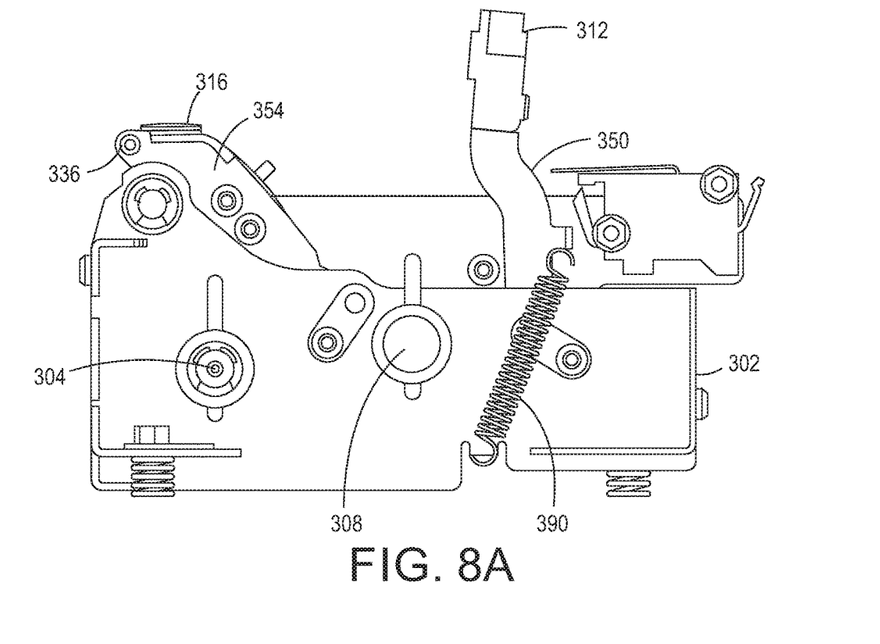
FIG. 8A to 8F illustrates the movement of the components of the modular unit shown in FIG. 3 to remove the take-up and supply rollers from the unit.
Figure 8B:
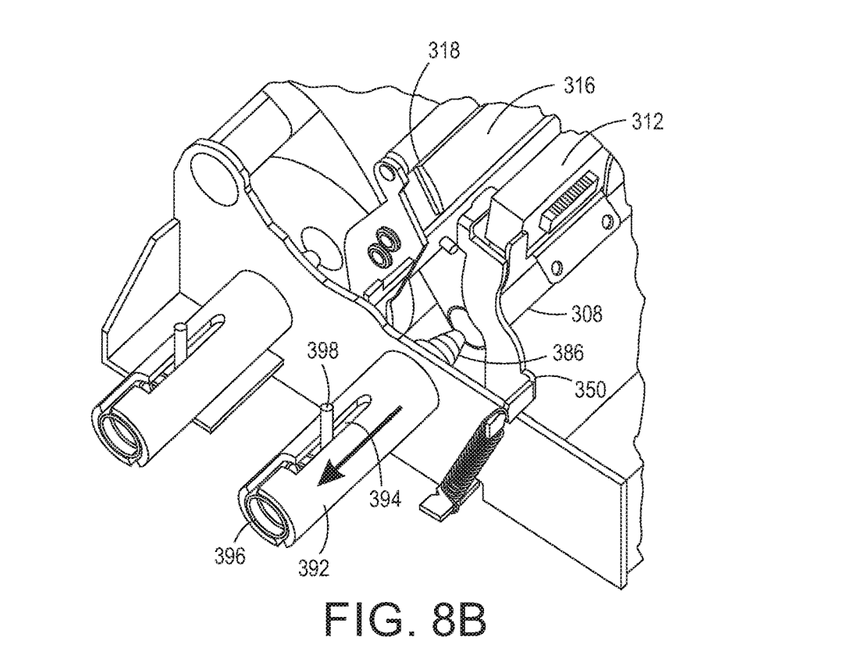
Figure 8C:
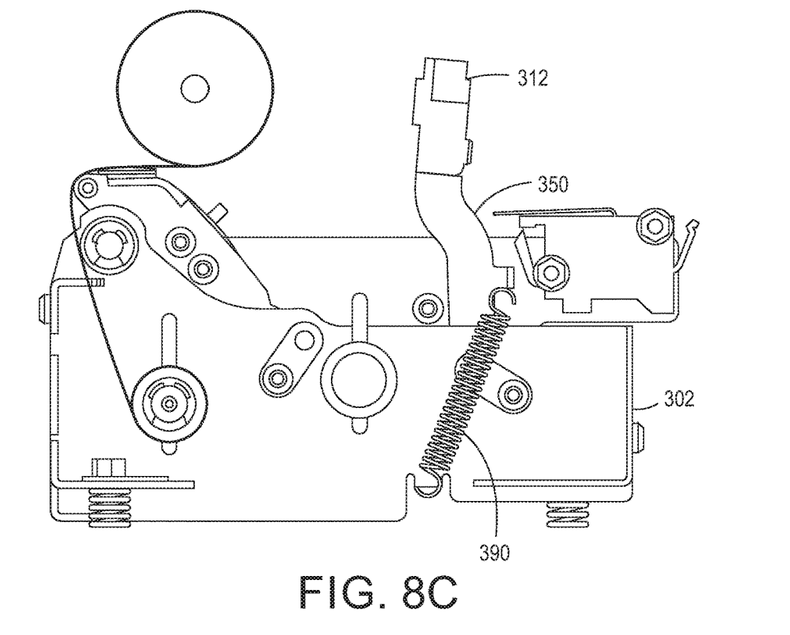
Figure 8D:
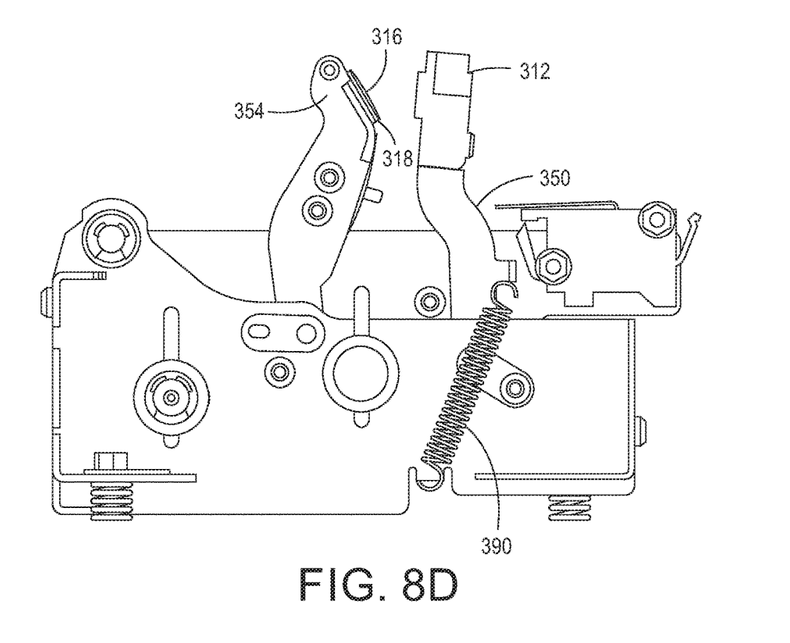
Figure 8E:
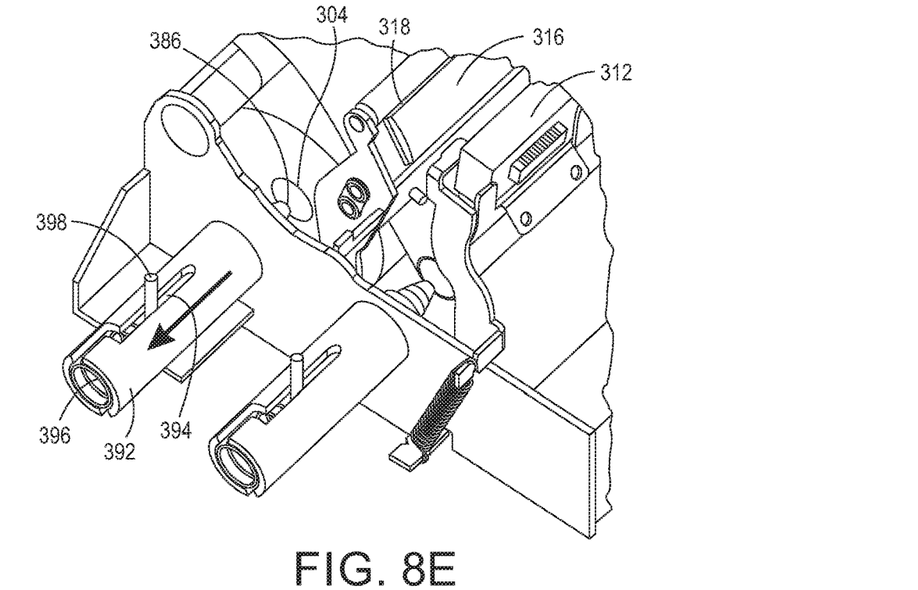
Figure 8F:
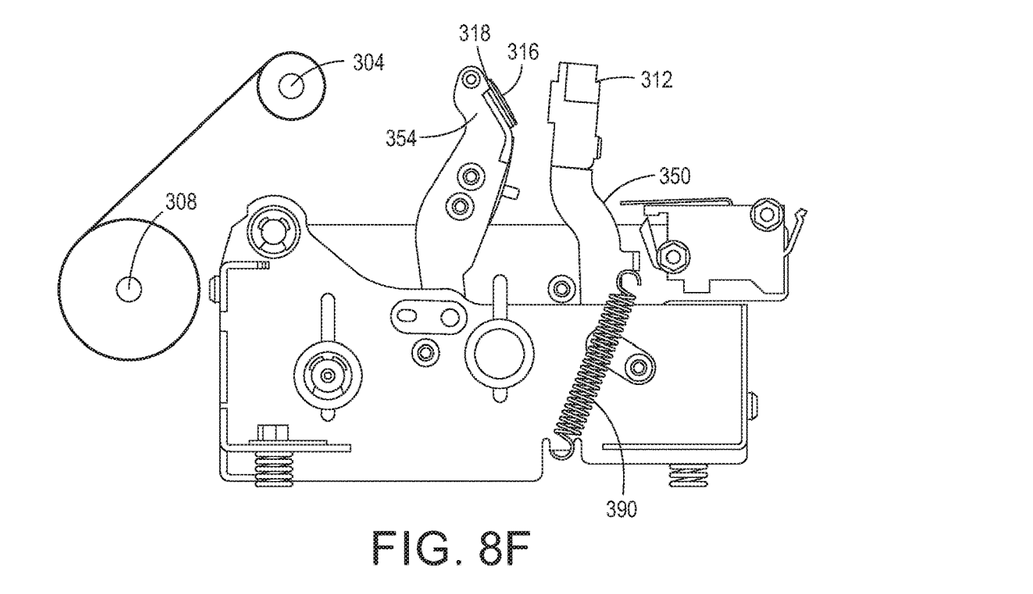

The process for removing a spent roll of media is shown in FIG. 8A to FIG. 8F. In FIG. 8A, the sensor assembly arms 350 are rotated about pivot pins 362 to the position shown in the figure to make the take-up roller 308 accessible. FIG. 8B shows the structure of retractable mounting pins that detachably mount the rollers 304 and 308 to the frame 302. The mounting pin 386 for the take-up roller extends through the frame 302 into a sleeve 392. A biasing member 396, such as a spring, is positioned about the pin 386 and is between an outboard end of the sleeve that captures one end of the biasing member and an extension 398, which extends from the pin 386 through a slot 394 in the sleeve 392 so the extension is accessible. By pulling the extension along the slot away from the frame 302, the biasing member 396 is compressed between the end of the sleeve and the extension and the pin 386 is removed from the one end of the roller 308. Sufficient clearance between the frame 302 and the roller 308 is provided so that roller 308 can be moved toward retracted pin 386 to disengage the other end of roller 308 from driving motor 324. This release enables the roller 308 and the spent media to be lifted from the module 300 as shown in FIG. 8C. Once the take-up roller and spent roll are released, the platen arms 354 are rotated to the position in FIG. 8D to make the supply roller 304 accessible. As shown in FIG. 8E, the supply roller 304 is mounted to the frame 302 by a sleeve and pin structure as described above with reference to roller 308 and FIG. 8B. Now the supply roller 304 can be removed as shown in FIG. 8F. The spent media is removed from the rollers 304 and 308, a new supply roll installed on roller 304, and roller 304 is mounted on pins 386 within the frame 302. The platen arms 354 are returned to the position over the supply roll and the loose end threaded around the idler rollers 334 (FIG. 5) and over the test pattern platen 316 and the imaging platen 374. Roller 308 is mounted on the pins 386 and the loose end of the roll is wrapped about the roller 308. Once secured about the roller 308, the sensor assembly arms 350 are rotated to return the sensor assembly to the position above the imaging platen 374.

As is evident from the above description, the module 300 is a self-contained unit that can be easily installed and replaced within a printing system. Additionally, module 300 can be retrofitted into existing printing systems that do not currently have inoperative ejector detectors. The module 300 can be equipped with an appropriate media supply that enables different types of materials to be imaged and analyzed. For example, thermal paper can be installed for the detection of inoperative ejectors that eject clear materials. Reflective media can also be installed for detection of other materials ejected into test patterns.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A three-dimensional object printer comprising:
a printhead including a plurality of ejectors configured to eject drops of a marking agent;
at least one actuator operatively connected to the printhead, the at least one actuator being configured to move the printhead along a member; and
a printhead maintenance module, the printhead maintenance module having:
a frame;
at least two rollers detachably mounted within the frame;
at least two electric motors, each electric motor being operatively connected to one of the rollers in a one-to-one correspondence;
a platen extending across the frame in a cross-process direction;
a sensor assembly having an optical sensor configured to generate image data, the sensor assembly extending across the frame in the cross-process direction;
at least two pivoting arms to which the sensor assembly is mounted, the at least two pivoting arms being mounted to the frame about pivot pins to enable the pivoting arms to move between a position where the optical sensor generates image data of the printed test pattern on the media and a position where one of the rollers is accessible for removal; and
a controller operatively connected to the printhead, the at least one actuator, each electric motor, and the optical sensor in the sensor assembly, the controller being configured to:
operate the at least one actuator to move the printhead to a position opposite the platen in the frame;
operate the plurality of ejectors in the printhead to eject drops of the marking agent onto media adjacent the platen to form a printed test pattern;
operate one of the electric motors to rotate at least one of the rollers to move the media from the position opposite the printhead to a position opposite the optical sensor in the sensor assembly;
receive image data of the printed test pattern generated by the optical sensor; and
identify inoperative ejectors with reference to the image data of the test pattern.

2. The printer of claim 1, each of the pivoting arms further comprising:
a member configured to rest against the platen and position the optical sensor at a predetermined distance from the platen.

3. The printer of claim 2 wherein the predetermined distance corresponds to a focal distance for the optical sensor.

4. The printer of claim 1 further comprising:
at least two other pivoting arms to which the platen is mounted, the at least two pivoting arms being mounted to the frame about pivot pins to enable the at least two other pivoting arms to move between a position where the platen supports the media opposite the printhead and a position where the other roller is accessible for removal.

5. The printer of claim 1 further comprising:
at least one retractable pin configured to mount one of the rollers to the frame; and
at least one other retractable pin configured to mount the other roller to the frame.

6. The printer of claim 5, each retractable pin further comprising:
a sleeve positioned about the retractable pin, the sleeve having a slot;
a member extending from the retractable pin through the slot; and
a biasing member positioned within the sleeve, one end of the biasing member being captured by one end of the sleeve and another end of the biasing member being adjacent the member to enable the retractable pin to be pulled against the biasing member to remove the retractable pin from an end of one of the rollers.

7. A three-dimensional object printer comprising:
a printhead including a plurality of ejectors configured to eject drops of a marking agent;
at least one actuator operatively connected to the printhead, the at least one actuator being configured to move the printhead along a member; and
a printhead maintenance module, the printhead maintenance module having:
a frame;
at least two rollers detachably mounted within the frame;
at least two electric motors, each electric motor being operatively connected to one of the rollers in a one-to-one correspondence;
a platen extending across the frame in a cross-process direction;
a sensor assembly having an optical sensor configured to generate image data, the sensor assembly extending across the frame in the cross-process direction;
a heater mounted to the platen to heat media as the media passes over the heater; and
a controller operatively connected to the printhead, the at least one actuator, each electric motor, the heater, and the optical sensor in the sensor assembly, the controller being configured to:
operate the at least one actuator to move the printhead to a position opposite the platen in the frame;
operate the plurality of ejectors in the printhead to eject drops of the marking agent onto media adjacent the platen to form a printed test pattern;
operate one of the electric motors to rotate at least one of the rollers to move the media from the position opposite the printhead to a position opposite the optical sensor in the sensor assembly;
receive image data of the printed test pattern generated by the optical sensor;
identify inoperative ejectors with reference to the image data of the test pattern; and
activate the heater selectively.

8. A three-dimensional object printer comprising:
a printhead including a plurality of ejectors configured to eject drops of a marking agent;
at least one actuator operatively connected to the printhead, the at least one actuator being configured to move the printhead along a member; and
a printhead maintenance module, the printhead maintenance module having:
a frame;
at least two rollers detachably mounted within the frame;
at least two electric motors, each electric motor being operatively connected to one of the rollers in a one-to-one correspondence;
a platen extending across the frame in a cross-process direction;
a sensor assembly having an optical sensor configured to generate image data, the sensor assembly extending across the frame in the cross-process direction; and
a controller operatively connected to the printhead, the at least one actuator, each electric motor, and the optical sensor in the sensor assembly, the controller being configured to:
operate the at least one actuator to move the printhead to a position opposite the platen in the frame;
operate the plurality of ejectors in the printhead to eject drops of the marking agent onto media adjacent the platen to form a printed test pattern;
operate one of the electric motors to rotate at least one of the rollers to move the media from the position opposite the printhead to a position opposite the optical sensor in the sensor assembly;
operate the other electric motor to move the media between the position where the test pattern is printed and the position opposite the optical sensor in the sensor assembly;
receive image data of the printed test pattern generated by the optical sensor; and
identify inoperative ejectors with reference to the image data of the test pattern.

9. A three-dimensional object printer comprising:
a printhead including a plurality of ejectors configured to eject drops of a marking agent;
at least one actuator operatively connected to the printhead, the at least one actuator being configured to move the printhead along a member; and
a printhead maintenance module, the printhead maintenance module having:
a frame;
at least two rollers detachably mounted within the frame;
at least two electric motors, each electric motor being operatively connected to one of the rollers in a one-to-one correspondence, wherein the at least two electrical motors are configured to rotate each of the rollers independently and bidirectionally;
a platen extending across the frame in a cross-process direction;

a sensor assembly having an optical sensor configured to generate image data, the sensor assembly extending across the frame in the cross-process direction; and a controller operatively connected to the printhead, the at least one actuator, each electric motor, and the optical sensor in the sensor assembly, the controller being configured to:

operate the at least one actuator to move the printhead to a position opposite the platen in the frame;

operate the plurality of ejectors in the printhead to eject drops of the marking agent onto media adjacent the platen to form a printed test pattern;

operate one of the electric motors to rotate at least one of the rollers to move the media from the position opposite the printhead to a position opposite the optical sensor in the sensor assembly;

receive image data of the printed test pattern generated by the optical sensor; and identify inoperative ejectors with reference to the image data of the test pattern.

10. A printhead maintenance module for a three-dimensional object printer comprising:

a frame;

at least two rollers detachably mounted within the frame;

at least two electric motors, each electric motor being operatively connected to one of the rollers in a one-to-one correspondence to enable independent and bidirectional rotation of each roller;

a platen extending across the frame in a cross-process direction;

a sensor assembly having an optical sensor configured to generate image data, the sensor assembly extending across the frame in the cross-process direction;

at least two pivoting arms to which the sensor assembly is mounted, the at least two pivoting arms being mounted to the frame about pivot pins to enable the pivoting arms to move between a position where the optical sensor generates image data of the printed test pattern on the media and a position where one of the rollers is accessible for removal; and a controller operatively connected to each electric motor and the optical sensor in the sensor assembly, the controller being configured to:

operate one of the electric motors to rotate at least one of the rollers to move media from a position opposite a printhead where a test pattern is printed on the media to a position opposite the optical sensor in the sensor assembly;

receive image data of the printed test pattern generated by the optical sensor; and identify inoperative ejectors with reference to the image data of the test pattern.

11. The module of claim 10, each of the pivoting arms further comprising:

a member configured to rest against the platen and position the optical sensor at a predetermined distance from the platen.

12. The module of claim 11 wherein the predetermined distance corresponds to a focal distance for the optical sensor.

13. The module of claim 10 further comprising:

at least two other pivoting arms to which the platen is mounted, the at least two other pivoting arms being mounted to the frame about pivot pins to enable the at least two other pivoting arms to move between a position where the platen supports the media at the position where the test pattern is printed and a position where the other roller is accessible for removal.

14. The module of claim 10 further comprising:

at least one retractable pin configured to mount one of the rollers to the frame; and at least one other retractable pin configured to mount the other roller to the frame.

15. The module of claim 14, each retractable pin further comprising:

a sleeve positioned about the retractable pin, the sleeve having a slot;

a member extending from the retractable pin through the slot; and a biasing member positioned within the sleeve, one end of the biasing member being captured by one end of the sleeve and another end of the biasing member being adjacent the member to enable the retractable pin to be pulled against the biasing member to remove the retractable pin from an end of one of the rollers.

16. A printhead maintenance module for a three-dimensional object printer comprising:

a frame;

at least two rollers detachably mounted within the frame;

at least two electric motors, each electric motor being operatively connected to one of the rollers in a one-to-one correspondence to enable independent and bidirectional rotation of each roller;

a platen extending across the frame in a cross-process direction;

a sensor assembly having an optical sensor configured to generate image data, the sensor assembly extending across the frame in the cross-process direction;

a heater mounted to the platen to heat the media as the media passes over the heater; and a controller operatively connected to each electric motor, the heater, and the optical sensor in the sensor assembly, the controller being configured to:

operate one of the electric motors to rotate at least one of the rollers to move media from a position opposite a printhead where a test pattern is printed on the media to a position opposite the optical sensor in the sensor assembly;

receive image data of the printed test pattern generated by the optical sensor; and identify inoperative ejectors with reference to the image data of the test pattern activate the heater selectively.

17. A printhead maintenance module for a three-dimensional object printer comprising:

a frame;

at least two rollers detachably mounted within the frame;

at least two electric motors, each electric motor being operatively connected to one of the rollers in a one-to-one correspondence to enable independent and bidirectional rotation of each roller;

a platen extending across the frame in a cross-process direction;

a sensor assembly having an optical sensor configured to generate image data, the sensor assembly extending across the frame in the cross-process direction; and a controller operatively connected to each electric motor and the optical sensor in the sensor assembly, the controller being configured to:

operate one of the electric motors to rotate at least one of the rollers to move media from a position opposite a printhead where a test pattern is printed on the media to a position opposite the optical sensor in the sensor assembly;

operate the other electric motor to move the media between the position where the test pattern is printed and the position opposite the optical sensor in the sensor assembly;

receive image data of the printed test pattern generated by the optical sensor; and identify inoperative ejectors with reference to the image data of the test pattern.

18. A printhead maintenance module for a three-dimensional object printer comprising:

a frame;

at least two rollers detachably mounted within the frame;

at least two electric motors, the at least two electric motors being operatively connected to one of the rollers in a one-to-one correspondence and are configured to rotate each of the rollers independently and bidirectionally;

a platen extending across the frame in a cross-process direction;

a sensor assembly having an optical sensor configured to generate image data, the sensor assembly extending across the frame in the cross-process direction; and a controller operatively connected to each electric motor and the optical sensor in the sensor assembly, the controller being configured to:

operate one of the electric motors to rotate at least one of the rollers to move media from a position opposite a printhead where a test pattern is printed on the media to a position opposite the optical sensor in the sensor assembly;

receive image data of the printed test pattern generated by the optical sensor; and identify inoperative ejectors with reference to the image data of the test pattern.

* * * * *